Figure 3:
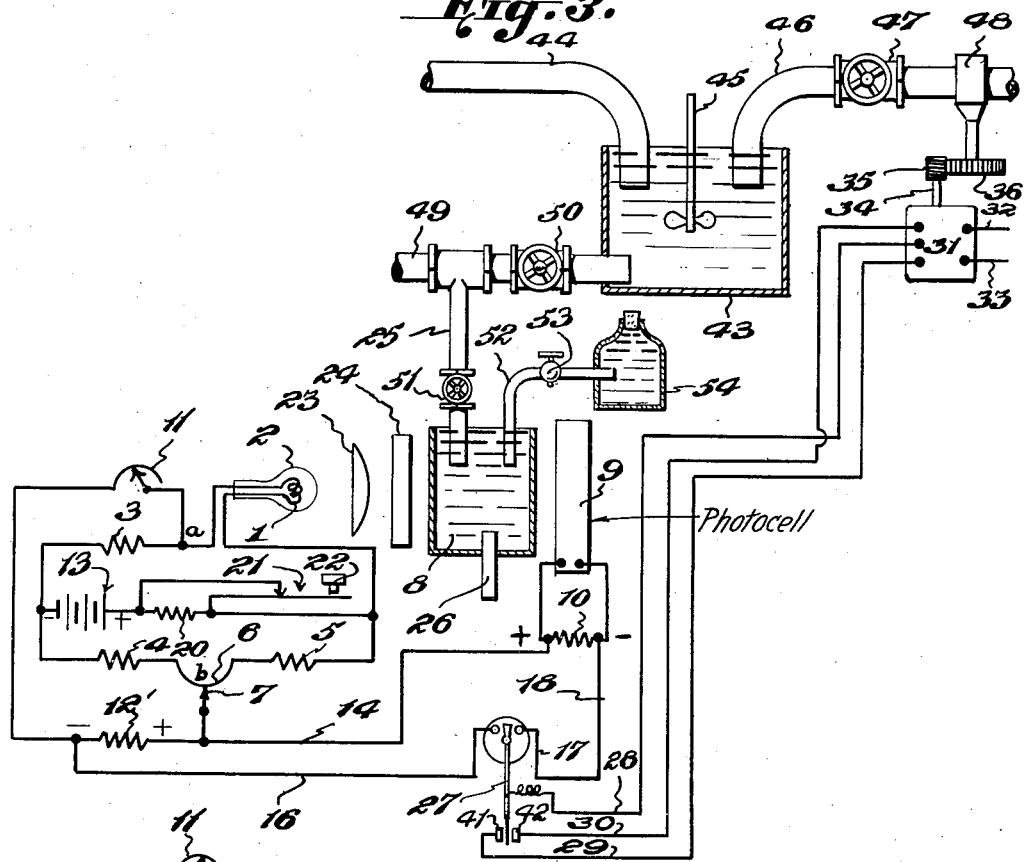

June 10, 1941.  N. E. BONN  2,245,124
MEASURING APPARATUS
Filed April 5, 1939  3 Sheets-Sheet 1
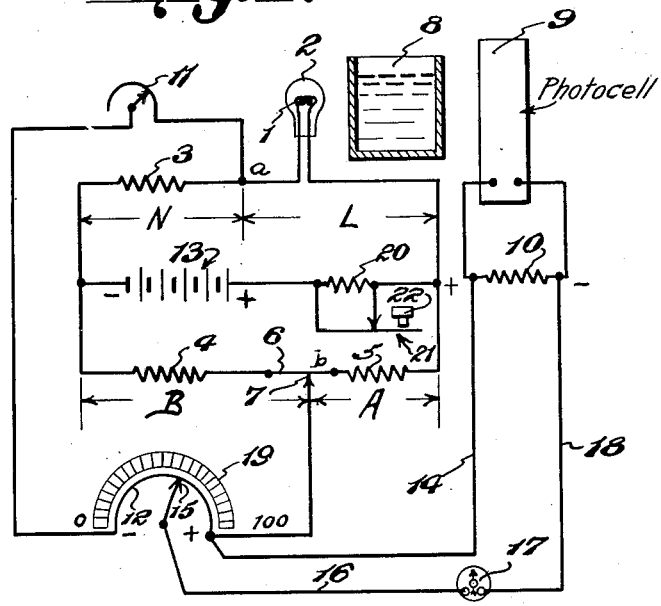
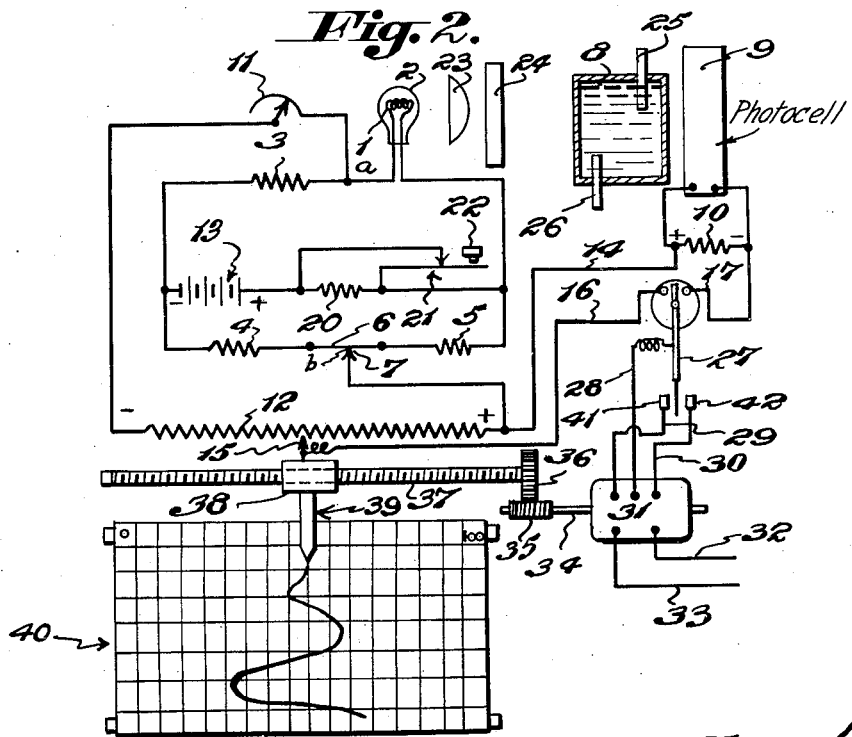
Inventor,
Norman E. Bonn
By: Henry C. Parker Inventor,
Norman E. Bonn
By: Henry C. Parker
Atty.

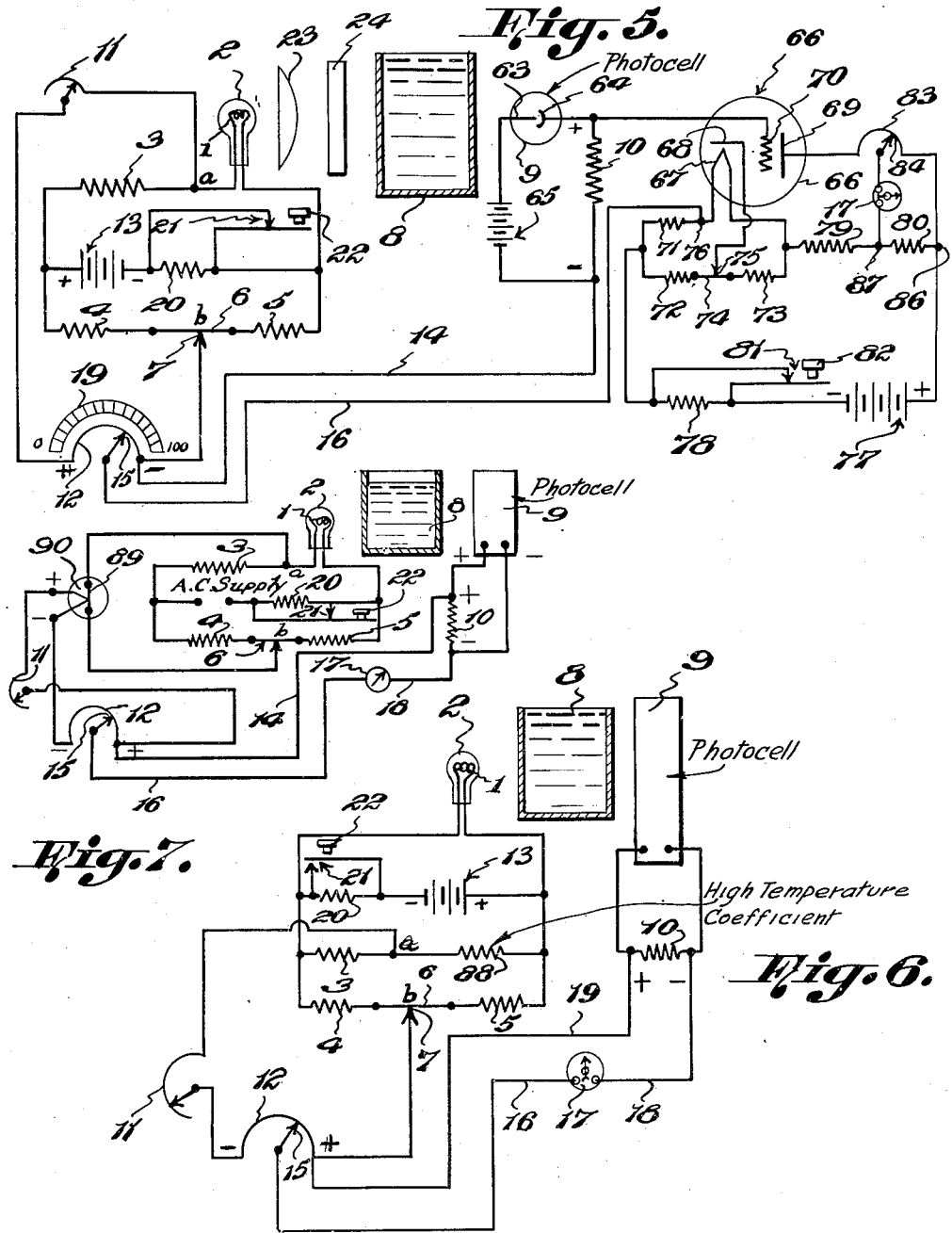

Patented June 10, 1941

2,245,124

UNITED STATES PATENT OFFICE 2,245,124

MEASURING APPARATUS

Norman E. Bonn, Philadelphia, Pa.

Application April 5, 1939, Serial No. 266,221

23 Claims. (Cl. 250—41.5)

This invention relates to a measuring apparatus, usually of the potentiometer type, wherein a resistance carrying an electric current is calibrated in terms of a potential difference or in terms of any other physical quantity which may be translated into a potential difference.

One object of my invention is to render the measurements performed with the aid of such apparatus accurate even when the voltage of the source which supplies current to the potentiometer resistance is subject to wide fluctuation. Other objects of my invention will become apparent from the description which follows.

My invention relates more particularly to apparatus of the type in which light from an incandescent electric lamp is allowed to impinge upon a photoelectric cell after having been partially absorbed or reflected by a medium the characteristics of which it is desired to measure and it provides for measurements which are independent of the voltage of the source of current supplying said electric lamp. The invention can be used, for example, in photoelectric colorimeters, turbidimeters, reflectometers, densitometers, smoke detectors and the like.

The development of photoelectric tubes and the more recent invention of self-generating photoelectric cells have stimulated the application of photoelectric methods of measurement in diverse fields of science and technology. In chemistry and in biology, for example, the old subjective colorimetric and turbidimetric methods of analysis are being rapidly replaced by photoelectric colorimetry and nephelometry, which are objective and therefore more accurate and convenient. Industry, too, is gradually adapting the photoelectric method to replace the more difficult and slower gravimetric and volumetric methods of chemical analysis.

In case of colorimetry which may be taken as an example, typical apparatus for measuring the absorption characteristics of a solution consists of an incandescent electric lamp, a transparent container for the solution, a photoelectric cell and a galvanometer. Often a filter is added to limit the light to a certain narrow band of the spectrum. The light from the lamp, after passing through the filter and the solution, falls upon the sensitive surface of the photocell and produces an electric current which is a measure of the amount of light which is transmitted by the solution. Under conditions of constant intensity of light source, it is possible to correlate in a quantitative way the magnitude of this current with the concentration of a given substance in the solution. In the case of turbidimeters, the quantity measured is the amount of light scattered by the particles in suspension which bears a definite relation to the turbidity of the solution which in turn may be quantitatively related to some important property.

Various makes of apparatus of this general class differ from each other in the method of obtaining scale readings. In some cases the scale is obtained directly from galvanometer deflections. Others use the potentiometer method. Still others obtain the scale mechanically by moving a neutral wedge, by varying the size of an aperture or by adjusting the layer-thickness of the solution. Regardless of the method used, the most important factor which limits the accuracy (and the usefulness) of apparatus of this class is the requirement for constancy of light source. To realize how difficult it is to meet this condition, it is sufficient to call attention to the fact that in a tungsten filament lamp a change of 1 per cent in applied voltage produces a change of about 4 per cent in the light output. This means that in order to obtain an accuracy of $\frac{1}{2}$ per cent in photoelectric measurements the supply voltage must be constant within $\frac{1}{8}$ per cent. For an accuracy of .1 per cent the voltage must not vary by more than .025 per cent or by one part in 4000. Constancy of such an order is impossible to obtain over any length of time even with the most elaborate control equipment, particularly in industrial applications.

In order to overcome the difficulties which arise from changes in voltage some workers in this field have resorted to the use of differential circuits in which two photocells are connected in electrical opposition to each other. Light from a single lamp is divided into two beams. One beam passes through a standard solution or some other fixed absorbing medium and falls upon one photocell, while the other beam, after passing through the solution under test, falls on the other photocell. The difference in output of the two cells is taken as a measure of the light absorbed by the test solution. In this arrangement variations in light intensity caused by voltage fluctuations is supposed to affect the two photocells alike, affording more accurate results than can be obtained with a single photocell. This method is based upon the assumption that the two photocells have identical characteristics. Experience, however, indicates that this is never actually realized in practice. Even if two cells are found that are fairly well matched under one set of conditions, they are usually found to differ widely when the intensity of the source is changed or when different filters are used. In addition to being only partially effective in producing the desired results, the two-photocell arrangement is more complicated, and apparatus incorporating this feature must have a number of additional adjustments which render such apparatus inconvenient and expensive.

In the arrangement which forms the preferred embodiment of my invention I use but one photocell. By the addition of simple, reliable and inexpensive elements I succeed in rendering photoelectric measuring apparatus substantially independent of voltage fluctuations within wide limits. My invention thus accomplishes the following objects:

1. It makes possible the attainment of much greater accuracy in photoelectric measurements than has been possible heretofore.
2. It employs simpler, more convenient and less expensive apparatus.
3. It opens the field for wide application of photoelectric measuring methods in industry by pointing the way to the use of rugged and automatic recording and controlling apparatus based upon the null method.
4. In addition, by the use of circuits devised by me, it renders possible the automatic recording of physical magnitudes where the amount of energy available is too small to operate the actuating mechanism of sturdy recording instruments based upon the null method of measurement.

Figure 4:
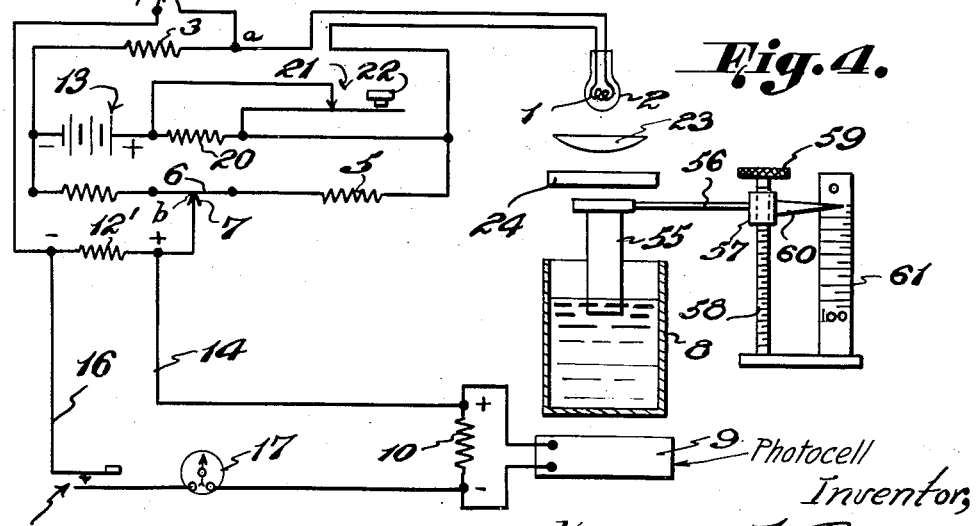

My invention can be explained in greater detail by reference to the accompanying drawings which show, more or less diagrammatically, several assemblies of apparatus elements with cooperating electrical connections which constitute illustrative embodiments of my invention. In this showing, Fig. 1 is a diagram illustrating schematically the main features of my invention as applied to the measurement of the light absorption of a solution, Fig. 2 is a schematic illustration of a similar nature as applied to an automatic recording apparatus, Fig. 3 illustrates schematically the application of my invention to automatic controlling apparatus, Fig. 4 illustrates an apparatus wherein the scale of transmission values is obtained by varying the thickness of the layer of the solution, Fig. 5 is a diagrammatic illustration of an arrangement utilizing a light-sensitive element of the photo-emissive type, Fig. 6 is an illustration of an alternative combination of certain elements comprising the compensating feature of my invention, while Fig. 7 shows an arrangement in which a source of alternating current is used.

In the various figures like elements are designated by like reference numerals. Referring to Fig. 1, electric incandescent lamp 2 has a filament 1 made of any suitable material such as tungsten. Situated in the path of the light from lamp 2 is absorption-cell 8 made of glass or any other suitable light-transmitting material. Absorption cell 8 contains the solution whose light-absorbing properties it is desired to measure. Any light not absorbed by the solution falls upon the face of photo-cell 9 to the terminals of which is connected resistor 10 preferably of relatively low resistance value and made of a material having a negligible temperature coefficient of resistivity, such as manganin. Photo cell 9 is, in this instance, of the barrier-layer type which has the property of generating an electric current proportional to the amount of light flux incident upon its sensitive surface, provided that the resistance connected across its terminals is not greater than several hundred ohms.

Filament 1 together with resistors 3, 4, 5 and slidewire 6 form a Wheatstone bridge network. As indicated in Fig. 1 the electrical resistance in ohms of the four bridge arms will be designated by the symbols L, N, A and B, where L is the resistance of lamp filament 1, N the resistance of resistor 3, A the resistance of resistor 5 together with that part of slidewire 6 which extends from resistor 5 and slider 7, and B the resistance of resistor 4 together with the remaining part of slidewire 6. The bridge is supplied with current by source 13. The resistances of bridge arms A, B and N are so chosen that for the desired temperature of filament 1 the bridge is out of balance, so that a potential difference $e$ exists between points $a$ and $b$. This potential difference sends a current through rheostat 11 and potentiometer 12. The drop of potential across the whole of potentiometer 12 can evidently be regulated by adjusting rheostat 11.

The positive end of potentiometer 12 is connected by lead 14 to the positive end of resistor 10, while slider 15 is joined by lead 16 to one terminal of galvanometer 17, the other terminal being joined by lead 18 to the negative end of resistor 10. When the potential difference between slider 15 and the positive end of potentiometer 12 is equal to the IR drop across resistor 10, no current flows through galvanometer 17, and its index indicates zero. Attached to potentiometer 12 is scale 19 which may be marked in even divisions from 0 to 100 to indicate the relative amount of light absorbed by the solution in absorption-cell 8 or it may be calibrated in terms of concentration of the constituent of the solution which is the cause of its light-absorbing quality, or in any other suitable manner.

The potential difference $e$ between points $a$ and $b$ may be expressed in terms of the voltage E applied to the bridge by the following equation:

$$e = E\left(\frac{L}{L+N} - \frac{A}{A+B}\right)$$

If all the values in the parentheses were constant, then a change in E would result in a proportionate change in $e$. In this case, however, a change in E effects a change in L, the resistance of lamp 2, and this causes the relative change in $e$ to be greater than the corresponding relative change in E. The percentage change in $e$ for a given percentage change in E depends upon the relative values of the bridge resistances, in particular upon the value of $$\frac{A}{A+B}$$

or upon the ratio of resistances A and B. It follows that by adjusting this ratio, as by moving slider 7, the rate of change of the unbalance potential difference $e$ with respect to total voltage applied to the bridge can be easily controlled. Since the current flowing through potentiometer 12 is substantially proportional to unbalance voltage $e$, it follows that by moving slider 7 the rate of change of this current and of the potential difference of potentiometer 12 with respect to voltage E of source 13 is easily adjusted to substantially any desired value.

For a numerical example it will be assumed that filament 1 is at a temperature of 2700 degrees K., that its resistance at that temperature is 10 ohms and that these conditions are realized when the voltage drop across the lamp is 10 volts. Assume also that bridge arm N has a resistance of one ohm. Under these conditions the voltage drop across bridge arm A is $$11\left(\frac{A}{A+B}\right)$$

volts. The potential difference between points $a$ and $b$ is evidently $$10-11\left(\frac{A}{A+B}\right)$$

volts. This is strictly true only when no current flows through rheostat 11 and potentiometer 12, but this factor may be neglected for reasons of simplicity, because this current is very small in comparison with the total current taken from source 13.

Now assume that the voltage of source 13 has dropped to some lower value so that the voltage across filament 1 is now only 9 volts. This will cause a considerable drop in the temperature of filament 1. Since the resistance of a tungsten filament decreases by about ½ per cent for each 1 per cent drop in the voltage applied to it, the resistance of filament 1 is now about 9.5 ohms. At the same time the amount of light emitted by filament 1 will decrease to about 60 per cent of its original value. This will cause the current generated in photocell 9 and the drop of potential in resistor 10 to decrease also to 60 per cent of their former values. Since the resistance of bridge arm N has undergone no change, the voltage of source 13 is now evidently $$9\frac{9.5+1}{9.5}=\frac{189}{19} \text{ volts}$$

The drop in bridge arm A is now $$\frac{189}{19}\times\frac{A}{A+B} \text{ volts}$$

and the potential difference between points $a$ and $b$ is now $$9-\frac{189}{19}\times\frac{A}{A+B} \text{ volts}$$

But it is evident that if the resistance values of bridge arms A and B are so chosen that the new potential difference between points $a$ and $b$ will now equal 60 per cent of the potential difference originally existing between these points, then the potential drop in potentiometer 12 will undergo the same relative change as the potential difference across resistor 10 under a change in voltage of source 13 with all other conditions remaining fixed. It follows that compensation is complete and that the indications of the instrument, with the bridge in such adjustment, will be fully independent of voltage fluctuations of source 13.

In order to obtain the ratio between bridge arms A and B necessary to effect the desired result, all that it is necessary to do is to solve the following equation which is but a statement in mathematical form of the ideas expressed above.

$$9-\frac{189}{19}\frac{A}{A+B}=.6\left(10-11\frac{A}{A+B}\right)$$

Solving this equation for $$\frac{A}{A+B}$$

we find that $$\frac{A}{A+B}=\frac{95}{106} \text{ or } \frac{A}{B}=\frac{95}{11}$$

It is convenient to make the resistance of arm A equal to 95 ohms and the resistance of arm B equal to 11 ohms. With such values for arm A and B, there will be perfect compensation for voltage fluctuations of source 13 provided that the assumptions relative to change in resistance and brightness of filament 1 are quantitatively correct.

While these assumptions and these calculations can be used as a guide in the design of apparatus in accordance with this invention, it is not at all necessary that the exact amounts be known by which the resistance of filament 1 and the light flux emitted by it change for a given change in applied voltage. In practice, there are incorporated within the apparatus itself means for adjusting the ratio between bridge arms A and B and means for ascertaining the proper adjustment of this ratio to obtain 100 per cent compensation. With such means at his disposal, the user of the apparatus can himself make from time to time the adjustments which may be required due to changes in the characteristics of lamp 2 with age, or when replacing an old lamp with a new one which may have different characteristics. To this end, there is provided within the apparatus, in addition to the elements already described, resistor 20 which is normally shorted by switch 21 operated by push-button 22. The operation is as follows:

With absorption-cell 8 filled with distilled water or some other solvent which may be useful in the particular technique, slider 15 of potentiometer 12 is set on the same zero of scale 19 corresponding to zero concentration of the constituent whose light-absorbing properties are under investigation. Rheostat 11 is then adjusted until galvanometer 17 indicates zero. This means that the potential drop across resistor 10 equals the potential drop across the whole of potentiometer 12. Push-button 22 is now depressed. This opens switch 21 and introduces in series with source 13 resistance 20 thus lowering the voltage available for lamp 2 by an amount which depends upon the magnitude of resistance 20. The value of this resistance may be conveniently chosen so that its introduction in series with source 13 reduces the voltage across filament 1 by about 10 per cent. If upon depressing push-button 22, galvanometer 17 remains at zero, it signifies that compensation is complete, because the change in the current of photocell 9 due to the decrease in light flux from lamp 2 must have been of the same relative amount as the decrease in current flowing in potentiometer 12 due to change in the unbalance potential of the bridge occurring between points $a$ and $b$. If, however, as is more likely to be the case, galvanometer 17 deflects when push-button 22 is depressed, this shows that compensation is not fully effective. In this case, push-button 22 is released and slide 7 of slide-wire 6 is changed in position thus altering the ratio of bridge arms A and B. This will cause galvanometer 17 to deflect. Balance is now restored by adjusting rheostat 11. These adjustments of slider 7 and rheostat 11 are repeated until the depression of push-button 22 produces no movement of the index of galvanometer 17. When this is accomplished compensation may be considered adequate for all changes of voltage across lamp 2 which are no greater than the change produced by depressing push button 22.

Once these adjustments are made they need not be repeated for more or less extended periods of time, depending upon the temperature of the filament and the rate of its deterioration. However, it is advisable to check this adjustment once a day by merely depressing push-button 22 and observing the action of galvanometer 17.

An alternative method of adjusting the ratio of bridge arms A and B and rheostat 11, to produce voltage compensation can be followed. In this method, after preliminary adjustment of rheostat 11, to produce zero deflection of the galvanometer, with slider 15 set at the zero of the potentiometer scale and with resistance 20 shorted, the push button 22 is depressed, throwing resistance 20 in series with the current source 13. This will, in general, cause a deflection of the galvanometer needle. The galvanometer can then be brought to zero deflection by adjustment of slider 7 which changes the bridge ratio. If the button 22 is now released, the galvanometer will, in general, be caused to deflect once more, in which case rheostat 11 can be adjusted to produce zero deflection, these operations being repeated until the depression of button 22 produces no deflection of the galvanometer needle. Of course, after voltage compensation is once attained, only minor adjustments of slider 7 and rheostat 11 are required in the subsequent use of the equipment, which adjustments can be made very quickly.

Having thus rendered the apparatus independent of fluctuations in the voltage of source 13, the user may now proceed to calibrate the potentiometer for various concentrations of the light absorbing constituent, by placing within the absorption cell 8 solutions containing this constituent in various known concentrations and in each case adjusting slider 15 of potentiometer 12 to obtain a balance as indicated by the absence of a deflection in the galvanometer 17, the reading of scale 19 for each concentration being noted. The calibration table or curve thus obtained will hold for future determination of this particular constituent in solutions of unknown concentration.

The wiring diagram shown in Fig. 1 can, of course, be employed in connection with one of the conventional automatic recording and/or controlling devices which are now on the market. For example the potentiometer 12 can be automatically balanced and a record can be made of the potentiometer readings while a solution whose light-absorbing characteristics are to be determined is flowing through the absorption cell 8. Or the slider 15 can be set at a point which represents the characteristic desired in a solution flowing through the absorption cell 8. Or the slider 15 can be set at a point which represents the characteristic desired in a solution flowing through absorption cell 8, the deflections of the galvanometer 17 being used, either directly or indirectly to control automatically the characteristics of the solution to the desired point, as will be readily understood by those skilled in this art and as will become evident from the following description.

The equipment shown in Fig. 1 can evidently be described broadly as comprising a Wheatstone bridge having the usual four arms and a source of current 13 connected to opposite points of said bridge, a compensating circuit including rheostat 11 and potentiometer 12 connected across said bridge diagonally with respect to said source of current, an energy emitting element 2 connected in one of the arms of said bridge, the energy emitted from said element being dependent upon the voltage of said source 13, an energy measuring circuit including an energy-receiving element adapted to receive energy from said energy-emitting element, said energy-measuring circuit being interconnected with said bridge and with said compensating circuit and being normally functionally dependent upon the changes in energy received by said energy-receiving element from said energy-emitting element induced by changes in the voltage of said source, and including means (slidewire 6 and slider 7) for adjusting the state of unbalance of said bridge to produce a potential difference in said compensating circuit varying with the voltage of said source of current in such a manner that the measurements are rendered independent of the voltage changes of said source of current.

In Fig. 2 I have shown, in a diagrammatic manner, an embodiment of my invention in an apparatus for automatically producing a graphic record of any variations in the color of a solution. This equipment includes all of the elements of Fig. 1 as well as a number of additional elements for automatically maintaining the circuit in balance and for producing the desired record.

In Fig. 2, absorption cell 8 is preferably of the flow type which receives the solution through inlet pipe 25 and discharges it through outlet 26. Interposed between lamp 2 and absorption cell 8 there are shown lens 23 for rendering the light rays parallel and light filter 24 which transmits light only in that part of the spectrum which is most suitable to the particular liquid flowing through absorption cell 8. The use of light filter 24 not only increases the sensitivity of the apparatus to a particular color, but also simplifies the calibration of the apparatus inasmuch as it may render applicable the well known Bourger-Beer law of transmission of monochromatic radiation.

To render the apparatus self-balancing the slider 15 of potentiometer 12 is fastened to nut 38 driven by screw 37 which is rotated in one direction or the reverse by gear 36 and worm 35 attached to shaft 34 of reversible motor 31 which receives electric current through leads 32 and 33 and is controlled by pointer 27 of galvanometer 17 and contacts 41 and 42 through leads 28, 29 and 30. Attached to nut 38 and moved by it simultaneously with slider 15 is marker 39 arranged to draw a line upon chart 40 which is preferably driven at constant speed at right angles to the direction of travel of nut 38 by a suitable clockwork or constant-speed motor not shown. The chart may carry an arbitrary scale marked 0 to 100 or it may be calibrated in terms of the density or concentration of the coloring constituent in the fluid whose characteristics are being determined.

The operation of the recorder is as follows: With lamp 2 lighted and with pure solvent (zero concentration of the chromogen) in absorption cell 8, suppose that the drop of potential in resistor 10 is greater than the potential difference between the right end of potentiometer wire 12 and slider 15. Galvanometer pointer 27 will be deflected to the right touching contact 42. This completes the circuit between conductors 28 and 30 and causes motor 31 to start in such a direction that nut 38 is moved to the left. Galvanometer pointer 27 should return to its neutral position and motor 31 should stop as soon as slider 15 has reached the left end of potentiometer wire 12. If such is not the case, rheostat 11 is adjusted until the potential drop across the entire potentiometer wire 12 just equals the potential drop across resistor 10. Push-button 22 should now be depressed and slider 7 and rheostat 11 adjusted, if necessary, to render the apparatus independent of fluctuations of voltage of source 13 in the manner previously described.

Having made these preliminary adjustments, the liquid whose color variations are to be graphically recorded is allowed to flow through cell 8. The presence of the chromogen in the solution will cause less light of the given wave length to reach photocell 9. As a result less current will flow in resistor 10, the electrical balance of the circuit will be destroyed and galvanometer pointer 27 will deflect to the left touching contact 41. This completes the circuit between conductors 28 and 29 and causes motor 31 to start in a direction to move nut 38 to the right. When slider 15 has reached a point where the potential difference between it and the right end of potentiometer wire 12 is just equal to the voltage drop across resistor 10, galvanometer pointer 27 will return to its neutral position, thus breaking the circuit between conductors 28 and 29 and causing motor 31 to stop. At the same time marker 39 will have occupied a position on the chart corresponding to the actual concentration of the chromogen in the solution. Evidently, with this arrangement any change in the concentration of the chromogen will cause nut 38 to move both a slider 15 and marker 39 either to the right or to the left, as the case may require, thus automatically maintaining the balance of the electrical circuit and at the same time producing a graphic record of the concentration of the chromogen on the chart 40. The mechanism illustrated in Fig. 2 for automatically balancing the circuit is of an elementary nature. It was purposely chosen in order to facilitate explanation. In practice, other conventional mechanism for accomplishing the same result, such as that disclosed in Letters Patent of the United States No. 1,125,699, may be preferred. It is to be understood that my invention comprehends the use of any other suitable or equivalent mechanism.

In Fig. 3 there is illustrated, in a diagrammatic manner an arrangement embodying my invention for automatically maintaining constant a certain light-absorbing characteristic or quality of a fluid when that characteristic can be controlled by the admixture of a material. The fluid may be such that its own inherent color can serve as an indication of the particular characteristic, or a color indicative of this characteristic may be developed for test purposes by the addition of an indicator to test samples. Cases of the latter type are particularly numerous. For example, the degree of acidity or alkalinity of liquors used in industrial processes is of great importance. Indicators are available which when added to the liquor, produce a color indicative of its pH value. In process control it is customary to obtain at frequent intervals samples of the liquor and, after adding an appropriate indicator, to test for color by visual or photoelectric inspection. Because my invention renders photoelectric measurements independent of voltage variations, it now becomes possible to exercise close control over the characteristics of a liquid in an automatic way which is not only more efficient but less costly.

The arrangement of Fig. 3 is in many respects similar to that of Fig. 2, but with these important differences. In place of potentiometer 12 and slider 15 there is substituted fixed resistance 12'. The voltage drop in resistor 12' is manually adjusted to equal the voltage drop in resistor 10 when the characteristic of the liquid corresponds to that desired. Thereafter, any departure from the desired condition results in a deflection of galvanometer pointer 27 which causes motor 31 to increase or diminish the rate of addition of the material which controls the particular characteristic.

Referring to Fig. 3, into reaction tank 43 there flows through pipe 44 the liquor which is to be treated by the addition of material supplied by pipe 46. The rate at which this material is supplied is controlled by valve 47, also by automatic valve 48 adjustable by reversible motor 31 through wheel 36 and worm 35 mounted on shaft 34. Stirrer 45, preferably power operated, serves the purpose of thoroughly mixing the material with the liquor. After treatment in tank 43 the liquor is discharged through pipe 49, the rate of discharge being controlled by the setting of valve 50. A small fraction of the treated liquor is diverted from pipe 49 through tube 25 into absorption cell 8 whence it is discharged through tube 26. Into absorption-cell 8 also flows from bottle 54 through tube 52 a suitable indicator solution. The rates at which the liquor and the indicator solution are supplied to absorption cell 8 are closely controlled by some suitable means, such as valve 51 and stopcock 53. The mode of operation is as follows:

Filter 24 is selected to have maximum transmission in that part of the spectrum which is most suitable to the indicator in use. With valve 51 and stopcock 53 closed and motor 31 disconnected from the power supply, absorption cell 8 is filled with a sample of the liquor which is known to possess the desired characteristic in optimum amount. The indicator is added and rheostat 11 adjusted until galvanometer pointer 27 is in neutral position. Push-button 22 is now depressed to test for the effect of voltage variation of source 13 and, if necessary, slider 7 and rheostat 11 are adjusted to render the system indifferent to such variations, as already explained. Valve 51 and stopcock 53 are now opened to the required extent and motor 31 joined to the power supply through leads 32 and 33. As long as the liquor flowing out of tank 43 has the desired characteristic in predetermined measure, photocell 9 will receive just the correct amount of light to cause it to generate the current required to make the potential difference across resistor 10 equal to the potential difference across resistor 12' regardless of possible fluctuations in the voltage of source 13. Under these conditions, galvanometer pointer 27 will remain in a neutral position and motor 31 at a standstill. If however, the characteristic of the liquor changes, either more or less light of the given wave length will reach photocell 9, causing its current output to increase or decrease respectively, with the result that a change occurs in the voltage drop across resistor 12'. This will cause the galvanometer pointer 27 to move from its neutral position in one or the other direction, as the case may require, completing the energization of motor 31 and causing it to adjust the position of valve 48 to increase or decrease, as the case may require, the supply of the characteristic controlling material to tank 43. When the rate of feed of this material is just right to produce the desired characteristic in the correct amount, the circuit will become balanced, galvanometer pointer 27 will return to its neutral position and motor 31 will stop, leaving valve 48 in correct adjustment corresponding to the new conditions.

An arrangement for obtaining scale readings by varying the layer thickness of the solution is illustrated schematically in Fig. 4. Here the light from lamp 2 is directed by lens 23 through filter 24 upon plunger 55 made of optical glass or other suitable material. After passing through plunger 55 and the solution contained in absorption cell 8, the unabsorbed light falls upon the sensitive surface of photocell 9. Plunger 55 is rigidly connected by member 56 to nut 57 movable in a vertical direction by screw 58 actuated by knurled head 59. Attached to nut 57 is pointer 60 of stationary scale 61. Potentiometer 12 and slider 15 of Figs. 1 and 2 are replaced by fixed resistor 12'. In series with galvanometer 17 is placed key 62 which may be of the lock-down type and which serves the purpose of protecting galvanometer 17 against violent deflections which may take place when the circuit is greatly unbalanced.

To calibrate such apparatus for use in a given technique, the following procedure may be followed. A number of solutions containing the chromogen in various known concentrations, all in the same solvent, are made up. The solution containing the chromogen in lowest concentration is placed within absorption cell 8 first and pointer 60 brought to zero on scale 61 by adjusting knurled head 59, which gives the solution its greatest layer thickness. While gently tapping key 62, rheostat 11 is adjusted until galvanometer 17 shows no deflection. Key 62 is now locked down and push-button 22 tapped to observe the effect of a variation in the voltage of source 13. If necessary, slider 7 and rheostat 11 are adjusted until galvanometer 17 remains at zero when push-button 22 is depressed.

Having thus rendered the apparatus insensitive to fluctuations in voltage of source 13, the remaining samples of solution containing the chromogen in known concentrations are placed in succession in absorption-cell 8 and in each instance galvanometer 17 is brought to zero by adjusting plunger 55 using knurled head 59 and leaving the adjustment of slider 7 and rheostat 11 undisturbed. The readings of scale 61 thus obtained are tabulated or plotted in the form of a curve of concentration vs. scale reading. Having once prepared such table or curve, solutions of unknown concentration may be measured subsequently by placing them in absorption-cell 8 and adjusting plunger 55 to balance the electrical circuit containing resistors 10 and 12'. Occasionally it is desirable to check the adjustment of slider 7 and rheostat 11 to make certain that the ageing of lamp 2 has not disturbed the calibration. If such effect is noted the corrective adjustments are easily made as previously explained.

While I have shown in Fig. 4 a manually operated apparatus it will be understood by those skilled in this art that this arrangement, like the arrangement of Fig. 1, also lends itself to automatic recording in a manner similar to that shown in Fig. 2. In such case the controlling impulses are derived from galvanometer 17. Plunger 55 is motor operated and in place of pointer 60 there is provided a suitable pen or marker producing a record upon an appropriate chart.

In the several arrangements heretofore disclosed the light-sensitive device was assumed to be a photocell of the so called barrier-layer type which generates its own current under the influence of light. My invention, however, is not limited to use with devices of this type only, but can be used with equal advantage in conjunction with photosensitive devices of other types. An arrangement showing the application of my invention to a tube operating on the principle of photo-emission is illustrated in Fig. 5.

Here, phototube 9 contains anode 63 and cathode 64. Resistance 10 and battery 65 are connected in series between these two electrodes. Under the influence of light from lamp 2 transmitted by the solution in absorption-cell 8 a current will flow in resistor 10. This current, and consequently the drop of potential across resistor 10 is proportional to the light flux incident upon cathode 64. The potential difference across resistor 10 is in opposition to a potential difference derived from potentiometer 12.

Due to the high impedance inherent in phototubes of this type, the current flowing in resistor 10 is very small. In some cases it is satisfactory to use a sensitive reflecting galvanometer as a balance detector in the connections between resistor 10 and potentiometer 12. In the majority of cases, however, it is preferable to interpose an amplifier between resistor 10 and potentiometer 12 on the one side, the galvanometer 17 on the other side, as shown in Fig. 5.

Amplifier tube 66 contains heater 67, cathode 68, anode or plate 69 and control element or grid 70. Heater 67 is connected with resistances 71, 72, 73 and slidewire 74 to form a Wheatstone bridge, similar in arrangement to the bridge used in conjunction with lamp 2. Cathode 68 is connected to slider 75 of slidewire 74, while grid 70 is connected through resistor 10, lead 14, potentiometer 12, slider 15 and lead 16 to the junction point 76 of resistor 71 and heater 67. The bridge, including heater 67, receives current from battery or other suitable source 77 through resistors 79 and 80. In series with battery 77 there is also connected resistor 78 which is normally shorted by switch 81 controlled by push-button 82. The purpose of the last three items is to enable the user to test for response of the amplifier to variation in voltage of source 77. Connected between plate 69 and junction point 86 of source 77 and resistor 80 is potentiometer 83 whose sliding contact 84 is connected through galvanometer 17 to junction 87 of resistors 79 and 80. A convenient operating sequence is as follows:

With source 13 disconnected so that lamp 2 is dark and phototube 9 reecives no light, but with all other connections complete as indicated, slider 84 is adjusted until galvanometer 17 indicates zero. This means that the drop of potential between slider 84 and point 86 due to the current flowing to plate 69 is just equal to the drop in resistor 80 which carries the current supplying heater 67 and its associated network. The only voltage now acting in the input circuit of amplifier tube 66, i. e. between grid 70 and cathode 68 is the potential difference between point 76 and slider 75 which is the unbalance voltage of the bridge associated with heater 67 and which is advantageously negative to afford a desirable negative bias for grid 70. There is no potential drop in resistor 10 because phototube 9 is dark. Likewise, there is no potential difference in potentiometer 12 because source 13 is not supplying current to the bridge circuit associated with lamp 2. If now push-button 82 be depressed to reduce the voltage applied to the amplifier, there will result a drop in temperature of heater 67 and cathode 68, which will cause a decrease in the electron emission from the latter. Simultaneously there will be a decrease in the potential of plate 69 due the diminished drop in resistors 80, 79 and 73. As a result there will be a tendency for the plate current flowing through potentiometer 83 to decrease in much greater proportion than the corresponding decrease in the current flowing in resistor 80. However, the drop in the temperature of heater 67 will lower its resistance, and will cause the negative unbalance potential difference serving as a negative bias for grid 70 to decrease and thus tend to increase the palte current. By proper adjustment of slider 75, it is quite easy to cause the two effects to cancel each other and to have a condition where a change in the voltage of source 77 produces no change in the circuit including resistor 80 and galvanometer 17. Accordingly, the position of slider 75 is adjusted until galvanometer 17 exhibits no movement when push-button 82 is depressed.

It is evident that the compensating effect just described is essentially similar to that previously described in connection with lamp 2.

Having adjusted the amplifier so that it is not sensitive to variations in voltage of source 77, source 13 is now connected to the network of lamp 2, absorption-cell 8 is filled with pure solvent, slider 15 is set on the zero of the potentiometer scale 19 and rheostat 11 is adjusted until galvanometer 17 again reads zero. This means that the potential drop across the entire potentiometer 12 is just equal to the potential drop across resistor 10 due to electron emission from cathode 64 of photo-tube 9 caused by radiation from lamp 2. To test the system for freedom from effects of voltage variations of source 13, push-button 22 should be depressed and, if galvanometer 17 shows a deflection, slider 7 and rheostat 11 should be adjusted until the depressing of push-button 22 has no effect upon galvanometer 17. The system is now in complete adjustment to compensate for changes in both source 13 and source 77.

To measure the light absorption of a substance, the substance is dissolved in the same solvent in known concentration, the solution is placed in absorption-cell 8, and slider 15 is adjusted until galvanometer 17 again reads zero. The absorption or extinction coefficient of the solute may now be obtained by reference to a previous calibration of scale 19, or, in case of monochromatic light, by the applications of the law of Bourger and Beer previously mentioned.

In all the previous illustrations, I have shown lamp 2 as connected in one arm of the compensating bridge. While this arrangement is a convenient one and is preferred by me, other arrangements embodying my invention may be devised in which the lamp 2 is not a part of the compensating bridge circuit. One such arrangement is shown in Fig. 6. Here a bridge circuit is made up of resistors, of which one 88 is made of a material such as nickel which has a high temperature coefficient of resistivity, while the remaining resistors are made of a material having substantially zero coefficient of resistivity, such as manganin. The bridge is excited from the same source 13 which supplies lamp 2. The electrical resistance of resistor 88 thus becomes a function of the voltage of source 13. By proper choice of resistance values for the various bridge arms, it is possible to have a condition where a change in the voltage of source 13 produces the same relative change in the potential drop of potentiometer 12 as is produced in the light emitted by lamp 2 by the same cause, thus affording complete compensation.

It will be understood by those skilled in this art that lamp 2 and amplifier 66 of Fig. 5 and their associated networks may be operated from an alternating current source or sources through suitable rectifiers. It is also possible to light lamp 2 with unrectified alternating current, but to rectify the unbalanced voltage of the bridge to furnish direct current to the potentiometer 12. There are several other ways in which alternating current can be employed for lighting the lamp 2 within the scope of the present invention.

In the arrangements shown in Figs. 1 to 6 the Wheatstone bridge network including lamp 2 is shown supplied with current from an individual source, such as a storage battery. Since my invention affords effective automatic compensation for considerable voltage fluctuation, it is evident that the current for the bridge may be derived from any convenient source, such, for example, as the lighting or power mains. In locations where the available commercial supply is direct current, the connections between the bridge and the potentiometer would be the same as when using a battery, as previously explained. However, in the majority of locations the available power supply is generally alternating current. For such locations I prefer the arrangement diagrammatically illustrated in Fig. 7 in which there is interposed between the bridge network including lamp 2 and potentiometer 12 a suitable rectifier, so that while the bridge and the lamp 2 are supplied from an alternating current source, potentiometer 12 receives direct current, as required.

Although any suitable rectifier may be used, the one which I have selected as an example in Fig. 7 is of the well known thermocouple type, consisting of heater 89 and thermojunction 90 in good thermal contact therewith. Heater 89 is connected to points a and b of the lamp bridge, while thermocouple 90 is joined to potentiometer slidewire 12 through rheostat 11. An unbalance potential difference existing between points a and b causes a current to flow through heater 89 which raises the temperature of the junction of thermocouple 90 and generates a direct potential difference at the terminals of the couple which in turn sends a direct current through rheostat 11 and potentiometer 12. By proper selection of bridge resistors and by proper adjustment of the slider 7 it is possible to obtain a condition where a variation in the voltage of the source supplying the lamp bridge will cause a variation in the potential difference across potentiometer 12 which is equal to the change in the current flowing in resistor 10 caused by the resulting change in the light intensity of lamp 2, thus affording complete compensation. The effectiveness of the compensation may be tested, as before, by introducing a resistance in series with the source, as by depressing button 22.

In the previous disclosure I have confined the description to what I consider to be the most useful embodiment of my invention. However, it is not my desire to limit my invention to this single embodiment. The essential feature of my invention is the combination of an unbalanced Wheatstone bridge containing in one arm a lamp or some other resistor of substantial temperature coefficient with a source of voltage to supply current to a calibrated potentiometer resistance, such as is used for purposes of electrical measurement or control, in such a manner that variations in the voltage of said source do not affect the accuracy of said measurement or control. Just as slider 7 and rheostat 11 may be adjusted to cause the current in potentiometer 12 to vary in accordance with the brightness of lamp 2 under the influence of variations in the voltage of source 13, so these controls may also be adjusted to maintain the current flowing through potentiometer 12 at a constant predetermined value in spite of variations in the voltage of source 13. In fact, as will easily be perceived by those conversant with this art, the bridge and the controls may be so arranged that an increase in the voltage of source 13 results in a decrease in the current flowing through potentiometer 12. When the bridge is so adjusted that the potentiometer current remains constant under conditions of varying supply voltage, the combination becomes useful for all kinds of potentiometric measurements, as will be readily understood by those familiar with the potentiometric art. My invention comprehends all such arrangements, applications and modifications as come within the letter and the spirit of the following claims.

What I claim is:

1. In a system including an energy emitting element and a source of electric current for said element and a receiver for said energy, the combination of a plurality of electrical resistors in a bridge network to produce a potential difference, said bridge being adjusted to render said potential difference functionally dependent upon the voltage of said source, and means for applying said potential difference to another element of said system to counteract an effect produced upon said system by changes in emission from said first-named element caused by variations in voltage of said source.

2. In a system including an energy-emitting element, an energy-receiving element and a source of electric current, the combination of a plurality of electrical resistors in a bridge network to produce an unbalance potential difference, said bridge being adjusted to cause variations in the voltage of said source to effect changes in said potential difference which are substantially proportional to the corresponding changes in emission from said energy emitting element caused by said variations, and electrical means for applying said potential difference to a third element of said system to render it insensitive to said variations.

3. An electric circuit comprising an electrically actuated energy emitting element whose resistance and energy emission vary with the current passing therethrough, supplying said element and a receiver for said energy a plurality of electrical resistors connected in a bridge network to produce a potential unbalance, a source of current supplying said bridge and said energy emitting element, said energy emitting element being connected in one of the arms of said bridge in such manner that said unbalance is determined by the current passing therethrough, variable means for adjusting said unbalance to render said potential difference functionally dependent upon the voltage of said source, and means for applying said potential difference to another element of said circuit to counteract an effect produced upon said receiver by variations in emission from said emitting element caused by changes in the voltage of said source.

4. In photoelectric apparatus including a source of radiant energy, an electric source for supplying current thereto and a photo-responsive device adapted to receive energy from said first-named source and to produce an electric current as a result thereof, the combination of a plurality of electrical resistors in a bridge network to produce an unbalance potential difference, a circuit for opposing said potential difference to a potential difference derived from said photo-responsive device, variable electrical means for adjusting said first-named potential difference to substantial equality with said second-named potential difference, and means for adjusting said bridge to cause changes in the voltage of said second-named source to effect substantially equal variations in said two potential differences.

5. The combination with a potentiometer of a source of electric current, a Wheatstone bridge disposed between said potentiometer and said source and including a resistor subject to variation with changes in the voltage of said source, a circuit including a galvanometer for opposing said potentiometer with a potential difference to be measured, regulatory means for adjusting said bridge to render the indications of said potentiometer independent of said changes in voltage and variable electrical means for adjusting the range of said potentiometer.

6. In photoelectric apparatus including an electric incandescent lamp, an electric source for supplying current thereto and a photo-responsive device adapted to receive radiation from said lamp and to produce an electric current as a result thereof, the combination of a plurality of electrical resistors in a Wheatstone network to produce an unbalance potential difference, a circuit for opposing said potential difference to a potential difference derived from said photo-responsive device and varying with the brightness of said lamp, regulatory means for adjusting said network to cause a variation in the voltage of said source to effect a change in said first-named potential difference of a magnitude substantially equal to the corresponding change in said second-named potential difference, and adjustable electrical means for maintaining said two potential differences in substantial equality.

7. In photoelectric apparatus the combination with an electric lamp of a plurality of electrical resistors to form a Wheatstone bridge, a source of power supplying said lamp and said bridge, means for adjusting said bridge to produce a potential difference functionally dependent upon the temperature of said lamp a light-sensitive device adapted to receive radiation from said lamp and to produce an electric current as a result thereof, a circuit for opposing said potential difference derived from said device to a potential difference functionally dependent upon the radiation from said lamp and means for adjusting the rate of change of said first-named potential difference to substantial equality with the rate of change of said second-named potential difference under the influence of variations in the voltage of said source to render said apparatus insensitive to said variations.

8. In photoelectric apparatus, the combination with an electric incandescent lamp of a plurality of electrical resistors in an electrical network, a source of electric current for supplying said lamp and said network, variable means for adjusting said network to produce a potential difference subject to variation with changes in temperature of the filament of said lamp caused by fluctuations in the voltage of said source, a light-sensitive device adapted to be illuminated by said lamp and to produce an electric current as a result thereof, a circuit for opposing said potential difference due to the current produced by said device to a second potential difference subject to variation with changes in the brightness of said lamp caused by said fluctuations in voltage and regulating means for adjusting the rate of said first-named variation to substantial equality with the rate of said second-named variation to render the performance of said apparatus insensitive to said fluctuations in voltage.

9. The combination with a source of radiant energy of a plurality of electrical conductors in a Wheatstone bridge, a source of electrical current for said bridge, a receiver for said radiant energy, variable means for adjusting said bridge to produce a potential difference subject to variation with changes in the voltage of said source of current, a circuit for balancing said potential difference against a second potential difference derived from said receiver and subject to variation with changes in the intensity of said radiant energy occasioned by said changes in voltage and regulating means for adjusting the functional dependence of said first-named potential difference upon the voltage of said source of current in accordance with the functional relation which exists between said second-named potential difference and said voltage to render said changes in voltage without effect upon the balance in said circuit.

10. In photoelectric apparatus the combination with an electric incandescent lamp of a plurality of electrical resistors of substantially zero coefficient of resistivity in a bridge network, a source of electric current for said network, a photoelectric cell illuminated by said lamp and adapted to produce an electric current in consequence thereof, a variable resistor for adjusting said network to produce a potential difference dependent upon the temperature of said lamp and bearing a predetermined functional relation to the voltage of said source, a voltage-measuring circuit including a balance detector for opposing said potential difference to a second potential difference derived from said cell and bearing to the voltage of said source a functional relation similar to said first-named functional relations, and means for maintaining said potential differences in substantial equality whereby the variations in the voltage of said source are without effect upon the indications of said balance detector.

11. In a system including an energy-emitting element, a source of electric current for said element and a receiver for said energy, the combination of a plurality of electrical resistors in a bridge network to produce an unbalance potential difference, a circuit for applying said potential difference to another element in said system and regulatory means for adjusting said network and said potential difference to produce an effect upon said system which is equal and opposite to a similar effect produced upon said receiver by changes in voltage of said source, whereby the performance of said system is rendered independent of such changes.

12. Potentiometric measuring apparatus comprising a plurality of resistors of negligible temperature coefficient and a resistor of substantial temperature coefficient of resistivity mutually interconnected to form a Wheatstone bridge, a source of electric current connected to opposite points of said bridge, the resistance of said resistor of substantial temperature coefficient being dependent upon the voltage of said source, a circuit including a calibrated potentiometer connected to points of said bridge diagonally disposed with respect to said source of current and deriving current therefrom by virtue of said bridge being out of balance, and a circuit including a galvanometer for opposing to said potentiometer a potential difference to be measured, said bridge arms being so adjusted that a variation in voltage of said source of current is without effect upon the indications of said potentiometer, due to a concurrent compensating change in the resistance of said resistor of substantial temperature coefficient.

13. Potentiometric measuring apparatus comprising a Wheatstone bridge having three arms of substantially zero temperature coefficient and a fourth arm of substantial temperature coefficient, a source of current connected to opposite points of said bridge, the resistance of said fourth arm being dependent upon the voltage of said source, a circuit including a calibrated potentiometer resistance connected to points of said bridge diagonally disposed with respect to said source of current, said circuit deriving current from said source through said bridge, a second circuit including a potential difference to be measured, means including a detector of balance for opposing said potential difference to a potential difference derived from said potentiometer resistance, means for maintaining equality between said two potential differences and regulatory means for adjusting the arms of said bridge to cause the variations in the resistance of said fourth arm induced by changes in the voltage of said source to counteract an effect upon said apparatus normally produced by said changes in voltage, thereby rendering measurements obtained with said apparatus independent of fluctuations in the voltage of said source of current.

14. Photoelectric apparatus comprising the combination of a plurality of electrical resistors with an electric lamp to form a Wheatstone bridge, a source of current connected to opposite points of said bridge for supplying current to said lamp and to said bridge, the brightness of said lamp being dependent upon the voltage of said source, a circuit including a calibrated potentiometer resistance connected to points of said bridge diagonally disposed with respect to said source and deriving current therefrom by virtue of said bridge being out of balance, a second circuit including a light sensitive device electrically responsive to light emitted by said lamp and modified by said medium, means including a detector of balance for opposing a potential difference derived from said second circuit and dependent in magnitude upon the amount of light received by said light-sensitive device to a potential difference derived from said calibrated resistance, said bridge being adjusted to cause the current in said calibrated resistance to vary with changes in the voltage of said source in a ratio similar to the variations in said first-named potential difference caused by changes in the brightness of said lamp induced by said changes in voltage and means for adjusting said two potential differences to equality, the arrangement being such that said apparatus is rendered substantially insensitive to said changes in voltage of said source and responsive only to the property of the medium being measured.

15. An electric circuit including a thermionic tube comprising a heating element, an electron-emitting element, an electron-receiving element and an element adapted to control electrically the flow of electrons from said emitting element to said receiving element, the combination of a plurality of electrical resistors with said heating element to form a Wheatstone bridge, a source of electric current for supplying said heating element and said bridge, means for adjusting the arms of said bridge to produce an unbalance potential difference varying with the voltage of said source and with the temperature of said heating element and means for applying said potential difference to said control element to compensate for changes in emission from said electron-emitting element induced by said changes in voltage whereby the flow of electrons to said receiving element is rendered independent of the voltage fluctuations of said source of current.

16. An electric circuit including a thermionic tube comprising a heater, a cathode, an anode and a control grid, the combination of a plurality of resistors of negligible temperature coefficient with said heater to form a Wheatstone bridge, a source of current connected to opposite points of said bridge and supplying current to said heater and to said bridge, electrical connections from said grid and said cathode to points diagonally disposed in said bridge from said source of current, and regulatory means for adjusting said bridge to produce a potential difference between said grid and said cathode varying with the voltage of said source and the temperature of said heater in such a manner as to compensate for concurrent variations in said potential difference and in the emission from said cathode induced by changes in voltage of said source, thereby rendering the flow of electrons to said plate and the current in said plate circuit substantially independent of changes in the voltage of said source.

17. The circuit of claim 16 in which the cathode and the heater are combined in a single element.

18. An electric circuit comprising a thermionic tube including a heater, a cathode, an anode and a control grid, the combination of three resistors of substantially zero temperature coefficient with said heater to form a Wheatstone bridge, a fourth resistor connected between a point on said bridge and the circuit of said plate, a source of current connected across said fourth resistor and said bridge in series to furnish current to said heater and voltage to said plate, electrical connections from said cathode and the circuit of said grid to conjugate points of said bridge and means for adjusting said bridge to produce an unbalance potential difference acting in said grid circuit and varying with the voltage of said source in such a manner as to maintain the current in said plate circuit substantially independent of the changes in voltage of said source of current.

19. The circuit of claim 18, in which the cathode and the heater are merged in a single element.

20. A balance detector for an electrical circuit comprising a thermionic tube including a heating element, a cathode, an anode and a control grid, means for connecting a circuit including said cathode and said grid to said electrical circuit to test the state of balance in said electrical circuit, a galvanometer in the plate circuit of said tube adapted to indicate changes in current flowing to said plate from said cathode, a plurality of electrical resistors interconnected with said heating element to form a Wheatstone bridge, a source of current for said heater and said bridge connected to opposite points of said bridge, electrical connections from said cathode and said grid circuit to points of said bridge diagonally disposed with respect to said source of current, and means for adjusting said bridge to produce in said grid circuit a potential difference varying with the voltage of said source by virtue of resultant changes in the resistance of said heating element in such a manner as to compensate for concurrent variations in the emission from said cathode, thereby rendering the magnitude of the current flowing in said plate circuit substantially independent of changes in the voltage of said source of current and responsive solely to the condition of unbalance which may exist in said electrical circuit.

21. The apparatus of claim 20 in which a three-element thermionic tube is used in which the functions of the heating element and the cathode are combined in one element commonly called the filament.

22. The combination with a calibrated potentiometer resistance of a bridge network comprising a plurality of electrical resistors of negligible temperature coefficient and a resistor of substantial temperature coefficient, an electric source connected to opposite points of said bridge supplying current thereto, the resistance of said resistor of substantial temperature coefficient depending upon the magnitude of said current, electrical connections from said bridge to said potentiometer adapted to supply current to said potentionmeter by virtue of said bridge being out of electrical balance, a circuit including a detector of balance for opposing to said potentiometer a potential difference to be measured and means for balancing said circuit, the arrangement being such that variations in the voltage of said source are substantially without effect upon the accuracy of said potentiometer due to concurrent compensating changes in the resistance of said resistor of substantial temperature coefficient occasioned by resulting changes in the magnitude of said current.

23. In an electrical system comprising a plurality of elements including a source of current the method of rendering said system insensitive to changes in voltage of said source which sonsists in combining a resistor of substantial temperature coefficient with a plurality of resistors of negligible temperature coefficient to form a bridge network, interposing said network between said source and the other elements of said system and adjusting the resistors of said network to produce an unbalance potential difference producing an effect upon said system which is equal and opposite to a similar effect produced within said system by said changes in voltage.

NORMAN E. BONN.